United States Patent [19]

Small et al.

[11] 4,245,296
[45] Jan. 13, 1981

[54] MEANS AND METHOD FOR CONTROLLING THE OPERATION OF AN APPLIANCE AND THE LIKE

[75] Inventors: James E. Small, Indianapolis; Mark E. David, New Palestine, both of Ind.

[73] Assignee: Emhart Industries, Inc., Indianapolis, Ind.

[21] Appl. No.: 968,285

[22] Filed: Dec. 11, 1978

[51] Int. Cl.³ .................. G05B 19/08; G06F 15/46; H01H 43/04
[52] U.S. Cl. .................. 364/104; 219/492; 307/141.4; 340/309.4; 364/120; 364/400; 364/569
[58] Field of Search .............. 364/477, 400, 104, 120, 364/107, 569, 200 MS File, 900 MS File, 118; 219/506, 492, 501, 10.55 E; 307/141, 141.4, 141.8, 41; 340/309.1, 309.2, 309.4

[56] References Cited

U.S. PATENT DOCUMENTS

| | | | |
|---|---|---|---|
| 3,603,961 | 9/1971 | Duris et al. | 340/309.1 X |
| 4,001,599 | 1/1977 | Karklys | 307/141 |
| 4,035,795 | 7/1977 | Fosnough et al. | 307/141.4 X |
| 4,068,179 | 1/1978 | Sample et al. | 340/309.4 X |
| 4,071,773 | 1/1978 | Scott | 307/141 |
| 4,084,237 | 4/1978 | Beachem et al. | 364/400 |
| 4,104,542 | 8/1978 | Karklys et al. | 307/141 |
| 4,158,432 | 6/1979 | Van Bavel | 364/900 X |

Primary Examiner—Joseph F. Ruggiero
Attorney, Agent, or Firm—Robert F. Meyer; David W. Gomes

[57] ABSTRACT

A control system for controlling the operation of an appliance and the like, wherein the appliance includes at least one machine function having a cycle of operation associated therewith, includes a central control element having stored therein an instruction repertoire for operation of the appliance and a plurality of selectable indices of fixed periods for the cycle of operation of the machine function. Further included in the control system are a plurality of patch cords each corresponding to various time periods which may be added to a selected index of fixed periods to provide a plurality of variable time periods for the cycle of operation and a plurality of momentarily operable devices some of which correspond to the fixed periods of a selected index of fixed periods and some of which correspond to variably programmed periods for selecting either a fixed period or a variably programmed period for the cycle of operation. Also provided is circuitry for removing power from the appliance if a momentarily operable device is not actuated within a predetermined period of time after initial application of power to the appliance and circuitry for distinguishably indicating when two momentarily operable devices have been coincidently actuated and when the cycle of operation is completed. Furthermore, associated with the instruction repertoire is a method of controlling the appliance operation.

2 Claims, 4 Drawing Figures

MEANS AND METHOD FOR CONTROLLING THE OPERATION OF AN APPLIANCE AND THE LIKE

BACKGROUND OF THE INVENTION

1. Field of the Invention

The present invention relates to the controlling of appliances and the like such as a microwave oven and more particularly a commercial microwave oven as opposed to a domestic microwave oven for household use which includes essentially one machine function having a cycle of operation associated therewith.

Generally speaking, the means and method for controlling the operation of an appliance as further described herein includes a central control element such as a microprocessor or microcomputer having stored therein an instruction repertoire for operation of the appliance and a plurality of selectable indices of fixed periods for the cycle of operation of the machine function, a plurality of patch cords each corresponding to various time periods which may be added to a selected index of fixed periods to provide a plurality of variable time periods for the cycle of operation, and a plurality of momentarily operable devices some of which correspond to the fixed periods of a selected index of fixed periods and some of which correspond to variably programmed periods for selecting either a fixed period or a variably programmed period for the cycle of operation.

2. Description of the Prior Art

Various control systems for controlling the operation of appliances and the like which have replaced the conventional electromechanical type timing apparatus are well known in the appliance art. In fact it is known that such control systems have employed microprocessors, microcomputers, or dedicated chips as the central control element to centrally control various system operations. This fact is particularly well known in the microwave oven art. However, one of the major problems heretofore experienced has been the inability to manufacture a single versatile control system which could be utilized in a plurality of appliances or models of a particular appliance because of the inability to easily change the time periods which may be selected for a particular cycle of operation for a particular appliance application. For example, one appliance manufacturer may desire that the control system provide time periods over a specific range of time periods and might further desire a number of peculiar time periods for the cycle which are not within such range of time periods and another appliance manufacturer may desire that the control system provide time periods over another completely different range of time periods and completely different peculiar time periods in addition, which are necessary for his particular appliance.

Heretofore, even with the use of a microprocessor or microcomputer, to provide control systems which would satisfy the needs of both of the above described appliance manufacturers would require a new entry of data and/or reprogramming of the microprocessor or microcomputer of the control system for each appliance manufacturer or for each appliance manufactured by a single manufacturer where the time periods associated with its cycle of operation are dissimilar. The problems enumerated above have left the control system manufacturer with a number of control systems each having their own peculiar range of time periods associated therewith for the operation of an appliance thereby increasing the cost and time associated with the manufacture of the control systems.

As will become apparent from the disclosure provided herein, the control system of the present invention solves these and other problems associated with the conventional control systems for controlling the operation of appliances.

SUMMARY OF THE INVENTION

In accordance with the present invention in its broadest concept, there is provided a means and method for controlling the operation of an appliance and the like, wherein the appliance has at least one machine function having a cycle of operation associated therewith, which includes a central control element having stored therein an instruction repertoire for operation of the appliance and a plurality of selectable indices of fixed periods for the cycle of operation of the machine function, a plurality of patch cords each corresponding to various variable time periods which may be added to a selected index of fixed periods to provide a plurality of variable time periods for the cycle of operation, and a plurality of momentarily operable devices some of which correspond to the fixed periods of a selected index of fixed periods and some of which correspond to variably programmed periods for selecting either a fixed period or a variably programmed period for the cycle of operation.

Accordingly, it is a feature of the present invention to provide a control system for an appliance and the like which because of its selectability features may be utilized by a plurality of appliance manufacturers and/or in a plurality of different appliances manufactured by a single manufacturer.

It is a further feature of the present invention to provide a control system as described hereinabove wherein the operator of the appliance has the option of selecting a fixed period from a previously selected index of fixed periods or a variably programmed period for the cycle of operation of the appliance.

Still another feature of the present invention is to provide a control system as described hereinabove which further includes an alarm circuit for distinguishably indicating when more than one momentarily operable device is coincidently actuated and the completion of the cycle of operation, circuit means for removing power from the appliance if a momentarily operable device is not actuated within a predetermined time period, and a display for indicating the amount of time remaining during the cycle of operation.

Another feature of the present invention is to provide a method of controlling an appliance and the like of the type described hereinabove which includes the steps of determining a selected index of fixed periods from a plurality of selectable stored indices of fixed periods for the cycle of operation of the appliance, determining whether an actuated momentarily operable device corresponds to a fixed period from the selected index of fixed periods, determining whether the actuated momentarily operable device corresponds to a variable programmed period, activating the machine function associated with the appliance, timing the cycle of operation of the machine function for a period corresponding to the actuated momentarily operable device and deactivating the machine function upon completion of the cycle of operation of the machine function.

Other features and advantages of the present invention will be apparent from the following detailed description of a preferred embodiment thereof, which description should be considered in conjunction with the accompanying drawings.

DESCRIPTION OF THE PREFERRED EMBODIMENT

Figure 1A:
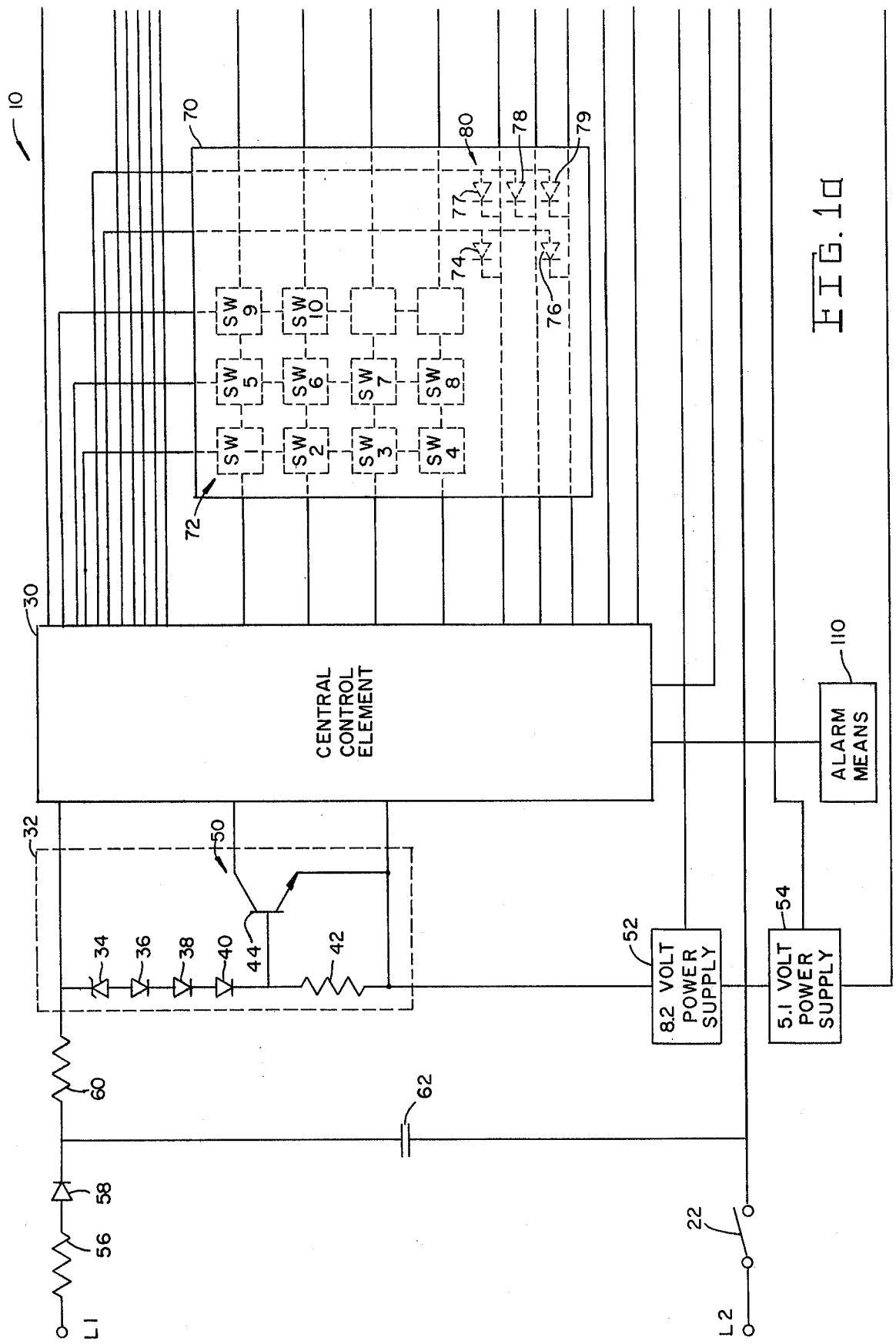
FIG. 1 (a and b) is a schematic functional block diagram of a control system constructed in accordance with the present invention.

Illustrated in FIG. 1 (a and b) is a schematic block diagram of a control system 10 of the present invention which for purposes of this disclosure will be described with respect to its adaptation to controlling the operation of an appliance such as a microwave oven. However, it will be understood by those skilled in the art after reading the description of the invention provided hereinafter that it and/or the method associated with its functions may be adapted to control various other appliances and machines in general which include at least one machine function having a cycle of operation associated therewith and therefore it is not intended that the present invention be limited to any particular appliance or machine.

Referring specifically now to FIG. 1 (a and b), a control system 10 for controlling the operation of an appliance (not shown) of the type having a machine function 20 and a cycle of operation associated therewith includes a central control element 30, a 15 volt power supply 32 for operation of the control element 30, a means 50 for resetting the control element 30 after power has been removed from the appliance for a predetermined period of time, an 8.2 volt power supply source 52 for operation of a display 120, a 5.1 volt power supply 54 for operation of display 120 and of a function control means 26, an addressing means 70 for addressing the central control element 30 whereby various data stored within central control element 30 is retrieved and the appliance is operated in accordance with a previously stored instruction repertoire, an alarm circuit means 110 for distinguishably indicating an improper entry by addressing means 70 and the completion of the cycle of operation of machine function 20, and means 130 for variably programming the central control element 30 to include time periods for the cycle of operation of machine function 20 other than those fixedly stored within central control element 30.

In the preferred embodiment of control system 10, central control element 30 is a single large scale integrated (LSI) chip microcomputer of the type manufactured by Rockwell International Corporation and identified as PPS-4/1 MM75. The PPS-4/1 MM75 microcomputer includes a self-contained clock generator circuit which may be used for any internal logic functions to be performed by the microcomputer, a program memory or read only memory (ROM) which provides storage for a program instruction repertoire and various constants required to operate the microcomputer, a program counter for addressing the various program instructions in the repertoire stored in the ROM, a data memory or random access memory (RAM) which provides storage for variable data enterable through an addressing or programming means 70, and a central processing unit for implementing the program instructions of the repertoire and in accordance with the stored data, by accumulating the program instructions and data, performing either binary or decimal arithmetic.

In the present invention four (4) indices or pages of fixed times will have been stored in the ROM of central control element 30 during the manufacturing of the control element 30. As will be described in more detail hereinafter, a particular index of fixed time periods of the cycle of operation of machine function 20 will be selectable in accordance with desired time periods for the cycle of operation whereby utilizing addressing means 70 the operator of the appliance (not shown) may select a particular fixed time period for the cycle of operation.

The PPS-4/1 MM75 microcomputer requires a 15 volt power supply for operation. As illustrated in FIG. 1a, a substantially 15 volt power supply 32 is provided. Since it is desirable for control system 10 to return to a ready mode of operation when power is removed from the control system, for example when the oven door is open for approximately 0.1 seconds, the 15 volt power supply 32 shown in FIG. 1a is unique in that it includes a typical 14 volt power supply and a means 50 for resetting the control element whenever power is removed from the control system 10 which provides approximately 0.7 volts whereby an approximately 15 volt power supply 32 is provided. As shown, the 14 volt portion of power supply source 32 includes the serially connected zener diode 34, three (3) diodes 36, 38, and 40, and resistor 42. The remaining approximately 0.7 volts is provided by the base-emitter junction of transistor 44.

The 8.2 volt power supply source 52 may include any conventional circuit means for providing the necessary voltage. Typically, the 8.2 volt power supply 52 will include at least one zener diode and various resistors, capacitors and other diode combinations electrically coupled in such a manner so as to supply the required 8.2 volts. Similarly the 5.1 volt power supply 54 will include at least one zener diode and various resistors, capacitors and other diodes in combination to provide the necessary 5.1 volts. Accordingly, any conventional circuitry well known in the art for supplying a particular voltage may be utilized as the 8.2 volt and 5.1 volt power supplies 52 and 54 respectively.

Figure 1B:
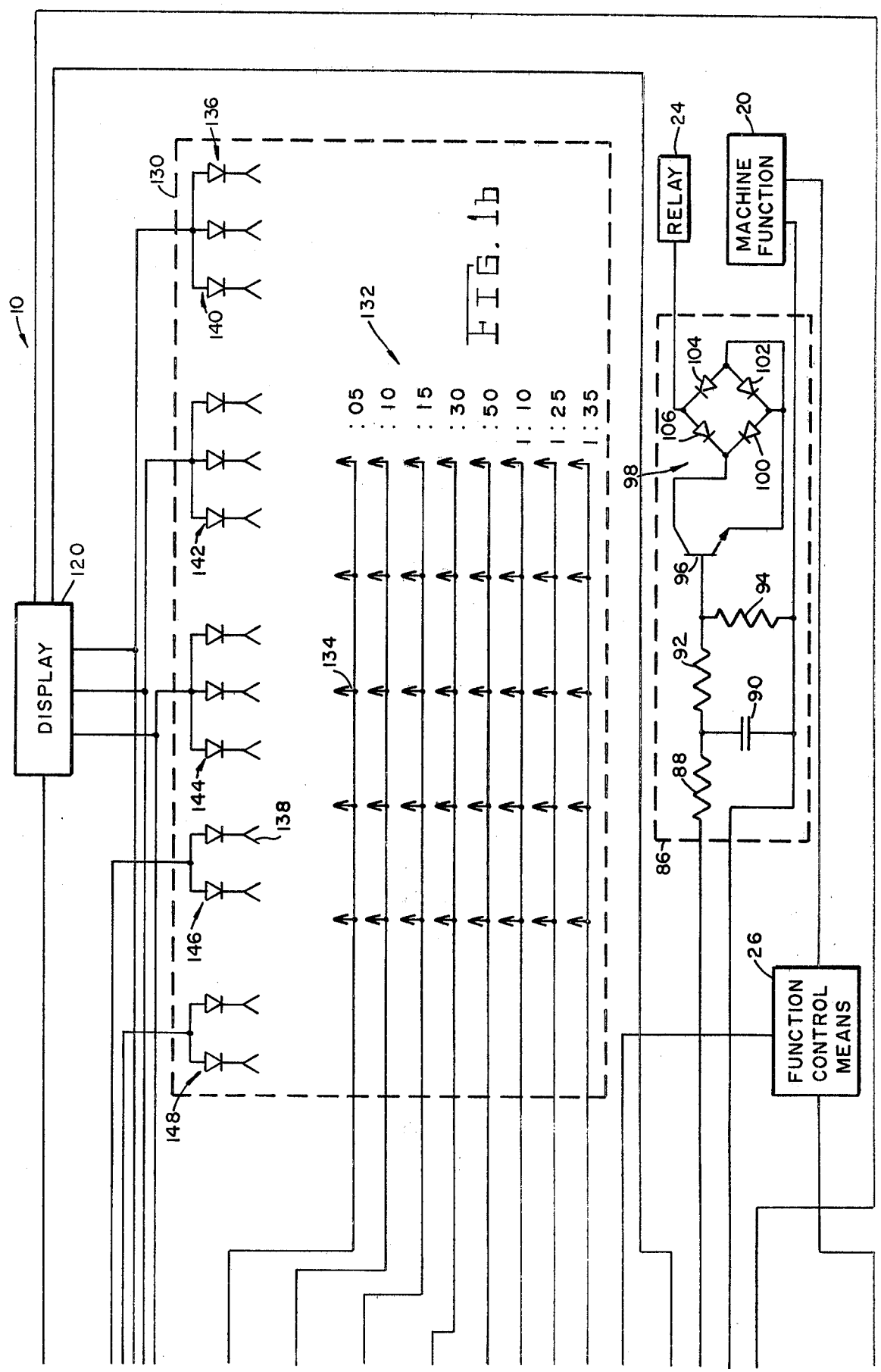

Continuing to refer to FIG. 1a, an alternating reference signal (AC) will be applied to terminal L1 and L2. A main power switch 22 will normally be provided in order to apply and remove the alternating reference signal from control system 10. As shown in FIG. 1b there may be associated with the main power switch 22 a relay 24 which either latches or unlatches the main power switch 22 in response to an appropriate signal. Typically, control system 10 will include the combination of a resistor 56, diode 58, resistor 60, and a capacitor 62 for regulating and filtering the alternating reference waveform upon application to control system 10. As previously indicated, the important element of 15 volt power supply source 32, 8.2 power supply source 52, and 5.1 volt power supply source 54 is a zener diode such as the zener diode 34 shown in 15 volt power source 32. The number and/or size of the zener diodes included within the power supply source in combination with resistors 56 and 60, diode 58 and capacitor 62 will provide a DC power supply source of a particular voltage.

A means 70 for addressing central control element 30 includes a plurality of momentarily operable switching devices 72 such as switches SW1, SW2, etc. which when actuated cause control element 30 to retrieve various data stored within its memory to control the appliance in accordance with the actuated switching device 72. Further included within addressing means 70 are provisions for the insertion of diodes 74, 76, 77, 78 and 79. As will be explained in more detail hereinafter, by inserting diode 74 in addressing means 70 as illustrated, control system 10 is enabled to function properly in response to an alternating reference signal having a frequency of 50 hertz (HZ) in lieu of the standard 60 hertz (HZ). In the absence of diode 74, control system 10 will operate compatibly with an alternating reference signal having a frequency of 60 hertz (HZ). Upon inserting the diode 76 in addressing means 70 as illustrated in FIG. 1a, an individual desiring to service control system 10 is enabled to rapidly advance the program instruction repertoire of central control element 30 at a speed which is substantially 60 times faster than the normal operation of control system 10. Diodes 77, 78, and 79 provide various means 80 for selecting an index of fixed time periods for the cycle of operation of machine function 20 from the four (4) indices of fixed periods stored within control element 30. As illustrated in FIG. 1a, each of the momentarily operable switching devices 72 and diodes 74 through 79 are electrically coupled to control element 30 in a matrix fashion. As further illustrated, any one or more of the momentarily operable switching devices 72 and/or diodes 74 through 79 may be added to or removed from addressing means 70 as desired by the manufacturer of control system 10. Accordingly, switches SW1 through SW10 and diodes 74 through 79 have been illustrated in a broken line fashion with the means interconnecting such switches and diodes to central control element 30 also illustrated utilizing broken lines showing the versatility of control system 10.

As further illustrated in FIG. 1a, control system 10 includes an alarm circuit means 110 electrically coupled to central control element 30 and responsive to the program instruction repertoire stored within control element 30. Alarm circuit means 110 may include any conventional alarm means for providing a signal to the operator of the appliance. In the preferred embodiment of control system 10, alarm circuit means 110 includes an amplifier circuit and piezoelectric transducer. As will be discussed in greater detail in the description of the operation of control system 10, alarm circuit means 110 should have the capability of distinguishably indicating when two or more momentarily operable switching devices 72 are coincidently actuated by the operator of the appliance and also the completion of the cycle of operation of machine function 20.

Referring now to FIG. 1b, control system 10 includes a means 86 for removing the alternating reference signal (AC power) from the control system 10 at the end of a predetermined period i.e. 60 seconds after closing of the main power switch 22, if a momentarily operable switching device 72 has not been actuated. The circuit means 86 for removing power from control system 10 does so by deactivating a relay 24 in response to a signal provided by circuit means 86 thereby opening main power switch 22. Circuit means 86 for removing power from control system 10 is electrically coupled to control element 30 and to the alternating reference signal through terminal L2 and main power switch 22. Included within means 86 is a resistor-capacitor combination including resistors 88, 92 and 94 and capacitor 90 electrically coupled as illustrated to provide protection for circuit means 86 from undesirable signals. Further included within circuit means 86 is an NPN transistor 96 having its base electrically coupled through the transient protection circuit to the central control element 30 and its emitter-collector junction electrically coupled to a diode bridge circuit 98. The diode bridge circuit 98 includes four diodes 100, 102, 104 and 106. The diode bridge circuit 98 is in turn electrically coupled to relay 24 whereby in response to circuit means 86 relay 24 deactivates control system 10 by opening main power switch 22. In operation, when main power switch 22 is initially closed, central control element 30 provides an appropriate signal whereby transistor 96 is inactive. After approximately 60 seconds transistor 96 is activated and diode bridge circuit 98 in conjunction with transistor 96 provides a direct short path across or in parallel with relay 24 thereby causing relay 24 to deactivate and open main power switch 22 and removing power from control system 10.

Continuing to refer to FIG. 1b, function control means 26 includes a plurality of circuit elements electrically coupled in a conventional manner to control the activation and deactivation of machine function 20 in response to central control element 30. Typically, a load switching device will be included in function means 26 to activate the machine function 20 in response to an appropriate signal from control element 30. This load switching device may be a triac, relay, etc. As shown in FIGS. 1a and 1b function control means 26 is electrically coupled to and therefore responsive to central control element 30 and further electrically coupled to the 5.1 volt power supply source 54.

There is further provided within control system 10 a display 120 for displaying the time remaining in the cycle of operation of machine function 20. Display 120 may be any conventional electronic display device such as a light emitting diode display or vacuum fluorescent display. Preferably, the display 120 will have the capacity to display at least 3 alpha-numeric digits simultaneously to the operator of the appliance. In the preferred embodiment of control system 10, display 120 is a 3 digit vacuum fluorescent display of the type manufactured by Futaba Corporation and identified as 4LT-31. As further illustrated in FIGS. 1a and 1b, display 120 is electrically coupled to central control element 30 and therefore is responsive to the program repertoire stored therein and is further electrically coupled to the 8.2 volt power supply source 52 and 5.1 power supply source 54. In operation, upon actuating a particular momentarily operable switching device 72 of addressing means 70, the time corresponding to such switching device will be displayed by display 120. As the time selected is being counted, display 120 will indicate to the operator of the appliance the time remaining in the cycle of operation of machine function 20. Before actuation of a particular momentarily operable switching device 72, but after the initial application of power to control system 10, a colon provided between the minutes and seconds displayed by display 120 will be illuminated to indicate that power has been applied to control system 10.

A means 130 for variably programming the central control element 30 includes a plurality of groups 132 of terminals 134 wherein each group 132 of terminals 134 have associated therewith a time period e.g. :05, :10, :15, :30, :50, 1:10, 1:25, and 1:35 as shown in FIG. 1b. These time periods may be derived from a plurality of timing resistors (not shown) in a manner well known to those skilled in the art. Further included within variable programming means 130 are a plurality of groups 136 of diodes 140, 142, 144, 146, and 148. Each diode has associated therewith a female patch cord 138 which may be electrically coupled to a selected terminal 134 of the group 132 of terminals. As shown in FIG. 1b, each group of diodes 140, 142, 144, 146 and 148 is electrically coupled to central control element 30 and the number of groups 136 of diodes will be equivalent to the number of momentarily operable switching devices 72 which are intended to correspond to variably programmable time periods for the cycle of operation of machine function 20. Furthermore, FIG. 1b shows that the number of terminals 134 within each group 132 of terminals will also be equivalent to the number of momentarily operable switching devices 72 corresponding to variably programmable time periods. In the preferred embodiment of control system 10, two momentarily operable switching devices 72 (i.e. switches SW9 and S10) have associated therewith through control element 30 groups 146 and 148 of diodes which include two diodes each. Three momentarily operable switching devices (i.e. switches SW6, SW7 and SW8) each have associated therewith three diodes within groups 140, 142, and 144 of diodes. Accordingly, switches SW6 through SW10 may be variably programmed for desired time periods by electrically coupling the female patch cords 138 associated with such momentarily operable switching devices 72 to various terminals 134 of the groups 132 of terminals in the following manner. For example, by electrically coupling the two female patch cords 138 associated with group 148 of diodes to two terminals 134 corresponding to time periods of :15 and :50 the momentarily operable switching device 72 corresponding to group 148 of diodes will have associated therewith a time period determined by the addition of :15 and :50 i.e. :65 seconds. Similarly the three patch cords associated with any one of the groups 140, 142, and 144 of diodes may be electrically coupled to various terminals 134 corresponding to different time periods whereby various time periods may be variably programmed for the momentarily operable switching devices 72 corresponding thereto.

Having described a preferred embodiment of the present invention, the operation of control system 10 will now be described. The theory of operation hereinafter described is that which is presently believed to be applicable to the embodiment described above; however it is not intended to limiting in nature. As will be understood by those skilled in the art, various programmed instructions may be added to the repertoire of program instructions associated with central control element 30 to allow the appliance to functionally operate in a manner different from that described hereinbelow without significantly departing from the essence of the present invention.

Figure 2A:
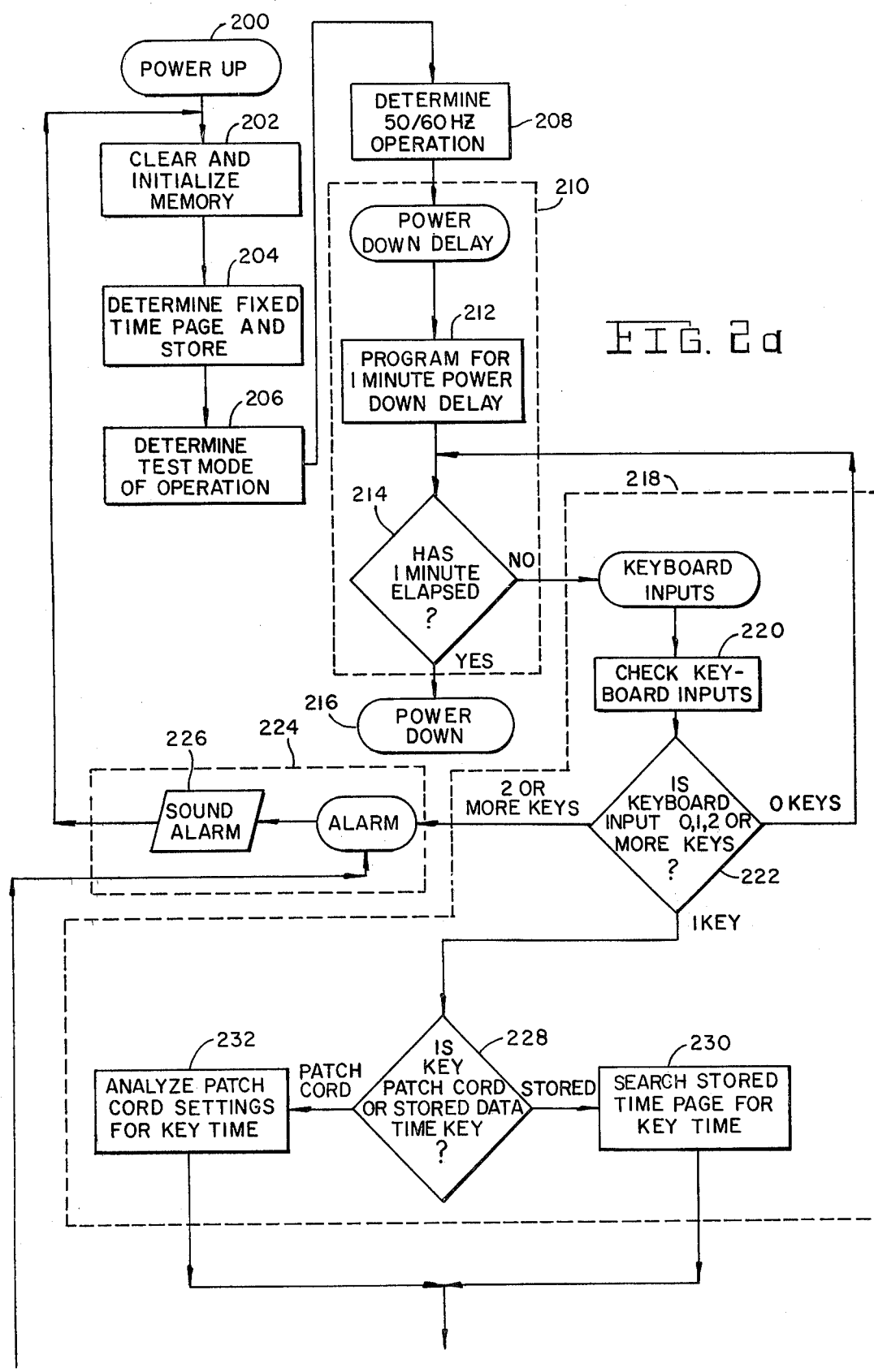
FIG. 2 (a and b) is a flow diagram charting the functions of the control system illustrated in FIG. 1 (a and b).
Figure 2B:
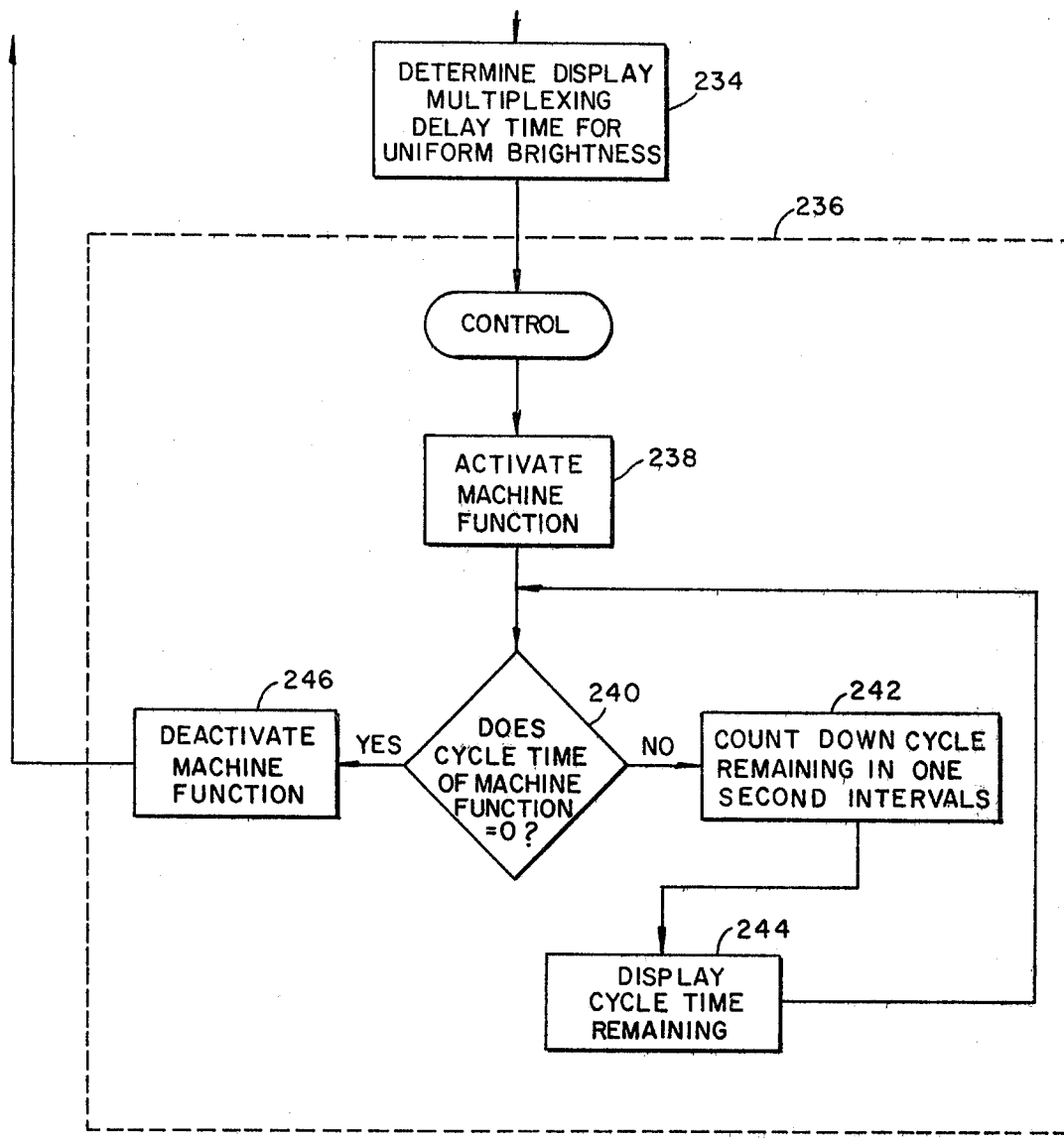

Referring now in general to FIGS. 1a and 1b and more particularly to FIGS. 2a and 2b, central control element 30 has stored therein a repertoire of program instructions for controlling the operation of an appliance (not shown) having a machine function 20 which are generally indicated by the flow diagram illustrated in FIGS. 2a and 2b charting the functions of the control system 10. It will be understood by those skilled in the art that while each program instruction will be discussed individually and each sequentially follows the other in the order described, the time required for the control element 30 to step through each of these instructions is considerably less in comparison to the time periods selected by the user of the appliance.

Initially, power is applied to control system 10 by the closing of main power switch 22 and the 15 volt power supply 32, the 8.2 volt power supply 52, and the 5.1 volt power supply will each be activated thereby placing the control system in a ready mode of operation. This is generally referred to as power up 200 in FIG. 2a.

Importantly, it should be noted that prior to using control system 10, various variable features will have been programmed in order to satisfy the needs of a particular application of the control system 10. For example, time periods corresponding to switches SW1–SW5 of momentarily operable switching devices 72 will have been selected from the four (4) indices of fixed time periods stored within central control element 30 by either inserting or not inserting a diode 77, 78, or 79 in addressing means 70.

In addition, variably programmable time periods corresponding to switches SW6–SW10 of momentarily operable switching devices 72 will have been selected and programmed for each switch SW6–SW10 by coupling the patch cords 138 associated with each switch SW6–SW10 e.g. three patch cords 138 each for switches SW6, SW7, and SW8 and two patch cords 138 each for switches SW9 and SW10, to desirable terminals 134 corresponding to various time periods e.g. :05, :10, :15, :50, etc. seconds, whereby the time periods associated with each patch cord 138 corresponding to a particular switch SW6–SW10 are additive to provide a programmed time period for each switch SW6–SW10.

Furthermore, a diode 74 will have been inserted or deleted to allow the control system 10 and therefore the appliance (not shown) to function in response to either a 50 hertz (HZ) AC line or a 60 hertz (HZ) AC line respectively.

Accordingly, once power up 200 has occurred and the control system 10 is thereby placed in the ready mode of operation, the central control element 30 will clear and initialize its memory 202, and in fact any time the AC power is removed from control system 10 and subsequently reapplied, control element 30 will perform the step of clearing and reinitializing its memory 202 thereby returning the control system 10 to a ready mode of operation. This step 202 will be performed any time the AC power is removed for a period of time e.g. approximately 0.1 seconds. Therefore, for example if the door of the appliance is opened at any time during the programmed steps for more than 0.1 seconds the control element 30 will return to step 202 and control system 10 must be reprogrammed for a desired time period.

Thereafter, the control element 30 determines which of the indices or pages of the four (4) indices or pages of fixed time periods stored therein has been selected for switches SW1–SW5 and stores the index or page within its memory. This step in the program is generally referred to as determine fixed time page and store 204.

Within addressing means 70 there are provisions for the insertion of another diode 76, if desired, for rapidly advancing the steps of the program at a speed of approximately 60 times faster than the normal speed. This capability is obviously advantageous with respect to testing and/or repair of the appliance. Accordingly, control element 30 determines whether diode 76 has been inserted i.e. whether the control system is in the test mode of operation. This step is generally referred to as determine test of mode of operation 206. Since it would be desirable to be able to place the control system 10 in the test mode of operation at any time for testing and then remove the control system 10 from the test mode after testing is completed, the appliance may be provided with an area accessible to the serviceman or even a switching device whereby the diode 76 may be inserted and removed conveniently when required.

Thereafter, the control element 30 checks to determine if diode 74 is included in addressing means 70, thereby determining whether the appliance is to operate in response to a 50 HZ or 60 HZ line frequency. In FIG. 2a this instruction is generally referred to as determine 50/60 HZ operation 208.

The control element 30 next enters the power down delay mode of operation generally indicated as 210 in FIG. 2a. The control element 30 is programmed for a one (1) minute or sixty (60) second power down delay 212 and continuously checks to determine if the one (1) minute has elapsed 214. If one (1) minute has elapsed since power up 200 without an input from addressing means 70, the control element 30 automatically removes power from the appliance i.e. power down 216. If one (1) minute has not elapsed since power up 200, the control element 30 enters the keyboard input mode 218 and continuously checks the keyboard input 220 of addressing means 70 to determine whether any momentary switching devices 72 has been actuated. This function is generally indicated as 222 FIG. 2a. If zero (0) keys have been actuated, the control element 30 returns to the power down delay mode 210 to again determine if one (1) minute has elapsed. If two (2) or more keys have been actuated, the control element 30 will enter an alarm mode of operation 224 thereby providing a beeping alarm; generally indicated as 226, sound alarm, in FIG. 2a; and thereafter reinitialize the steps of the program instructions by clearing and initializing the memory 202. If only one (1) key has been actuated, control element 30 determines if the key or momentarily operable device 72 actuated corresponds to a fixed time period or a variably programmed time period. This step is generally indicated in FIG. 2a as 228. If the key actuated corresponds to a variably programmed time period, the control element 30 then analyzes the patch cord 138 settings associated with the key actuated to determine the time period for operation of the appliance. This step is generally indicated in FIG. 2a as 232. If the key actuated corresponds to a fixed time period, the control element 30 searches the stored index of fixed time periods to determine the time period for operation of the appliance associated with the actuated key or momentarily operable device 72. This step is generally indicated in FIG. 2a as 230.

The next function performed by the control element 30 is generally indicated in FIG. 2b as 234; determine the display multiplexing delay time to assure uniform brightness of the display 120. Since it is possible that the frequency of the self contained clock generator circuit of control element 30 will not be identical each time the display 120 is operating, control element 30 calculates one-half (½) of the cycle time and provides a sufficient time delay to assure uniform brightness of the display 120.

The control element 30 is now ready to enter the control mode of operation 236 wherein the machine function 20 is activated as indicated by 238. Control element 30 then enters a loop whereby it continuously checks to determine if the time period selected has elapsed. This step is generally indicated in FIG. (2b) as 240. If the time period has not elapsed, the control element counts down the remaining time period in step 242 and coincidently displays the time remaining in the selected time period. The display step is generally indicated in FIG. 2b as 244. Control element 30 continuously checks each step 240, 242 and 244 of this loop until it determines that the time period has elapsed at which time machine function 20 is deactivated, step 246.

Once the machine function 20 is deactivated, control element 30 causes control system 10 to enter the alarm mode of operation 224 whereby an alarm sound, step 226, is produced which is distinguishable from the alarm sound produced when two (2) or more keys are actuated. Accordingly, the operator of the appliance can distinguish between the alarm indicating the completion of the time period and the actuation of two (2) or more keys.

In view of the above description of the preferred embodiment of the present invention it will be seen that the several objects of the invention are achieved and other advantageous results attained and that further modifications can be made without departing from the spirit and scope of the invention as defined in the appended claims.

What is claimed is:

1. A control system for a microwave oven including a heating function having a cycle of operation associated therewith, comprising:

a central control element including a microcomputer means having an instruction repertoire stored therein for controlling said heating function of said oven, said microcomputer means having a plurality of selectable indices of fixed time periods stored therein, with each said index including a plurality of fixed time periods;

means for programming said microcomputer means for selecting one of said plurality of indices of fixed periods for use by said instruction repertoire in controlling the cycle of operation of said heating function;

a first plurality of pushbutton means for inputting a selection of one of said fixed periods from the index of fixed periods selected by said means for programming, each of first said pushbutton means corresponding to a separate one of said fixed periods from the index of fixed periods selected by said means for programming, said control element being adapted to control said cycle of operation in accordance with a selection of one of said fixed periods;

programmable period determining means located in said control element for individually determining each of a plurality of variable time periods;

a second plurality of pushbutton means for inputting a selection of one of said variable periods, each of second said pushbutton means corresponding to a separate one of said variable periods, said control element being adapted to control said cycle of operation in accordance with a selection of one of said individually determined variable periods, whereby said control element is adapted to control said cycle of operation in response to either a selected one of said fixed periods or a selected one of said variable periods.

2. A method for controlling the cycle of operation of the heating function of a microwave oven comprising the steps of:

storing a repertoire of instructions and a plurality of indices of fixed time periods in a microcomputer memory of a control element;

determining one index from said plurality of indices for use by said control element in controlling said cycle of operation;

determining a plurality of variable time periods independently of said fixed time periods stored in said microcomputer memory;

allowing selection of a period from said determined index of fixed periods and said plurality of variable periods for controlling said cycle of operation of said heating function; and controlling said cycle of operation of said heating function in response to a selection of one of either said fixed periods or said variable periods.

* * * * *